United States Patent [19]

Nash et al.

[11] Patent Number: 5,249,280
[45] Date of Patent: Sep. 28, 1993

[54] MICROCOMPUTER HAVING A MEMORY BANK SWITCHING APPARATUS FOR ACCESSING A SELECTED MEMORY BANK IN AN EXTERNAL MEMORY

[75] Inventors: James C. Nash; Michael I. Catherwood; Kirk Livingston, all of Austin, Tex.

[73] Assignee: Motorola, Inc., Schaumburg, Ill.

[21] Appl. No.: 548,695

[22] Filed: Jul. 5, 1990

[51] Int. Cl.⁵ .......................................... G06F 12/00
[52] U.S. Cl. ................................. 395/425; 395/400; 364/254.3; 364/255.8
[58] Field of Search ............... 395/400, 425; 364/200, 364/900; 365/230.03, 230.04

[56] References Cited

U.S. PATENT DOCUMENTS

| | | | |
|---|---|---|---|
| 4,367,524 | 1/1983 | Budde et al. | 395/375 |
| 4,797,851 | 1/1989 | Suzuki | 395/425 |
| 4,827,402 | 5/1989 | Wada | 395/375 |
| 4,901,236 | 2/1990 | Utsumi | 395/400 |
| 5,023,828 | 6/1991 | Grundmann et al. | 395/375 |
| 5,091,853 | 2/1992 | Watanabe et al. | 395/375 |
| 5,129,068 | 7/1992 | Watanabe et al. | 395/400 |

Primary Examiner—Joseph L. Dixon
Assistant Examiner—Frank J. Asta
Attorney, Agent, or Firm—Charlotte B. Whitaker

[57] ABSTRACT

A memory expansion scheme is provided which permits a program to automatically cross memory bank boundaries, without user intervention. A memory bank address register stores a value corresponding to a selected memory bank (i.e. Bank 0), in a 4-bit subfield (K-Field). In the preferred embodiment, the K-Field is implemented using six (6) bank number registers, each of which is coupled to the corresponding address register, to form a 20-bit (extended) logical address. During an effective address calculation, in the index addressing mode, a 16-bit logical offset address, stored in an offset register, is added to the 20-bit (extended) logical address, by an adder in the ALU. The adder transfers a 20-bit physical address onto an address bus, via an address buffer. When the calculated address crosses a memory bank boundary, the upper four (4) address bits ($A_{16}$-$A_{19}$) are automatically updated, thereby enabling the program to cross a memory bank boundary without user intervention. Furthermore, in selected cases, the contents of the bank number register (address bits $A_{16}$-$A_{19}$) are automatically updated. Thus, the memory bank expansion scheme provides the capability to automatically cross memory bank boundaries, while automatically updating the information stored in the bank number register.

14 Claims, 6 Drawing Sheets

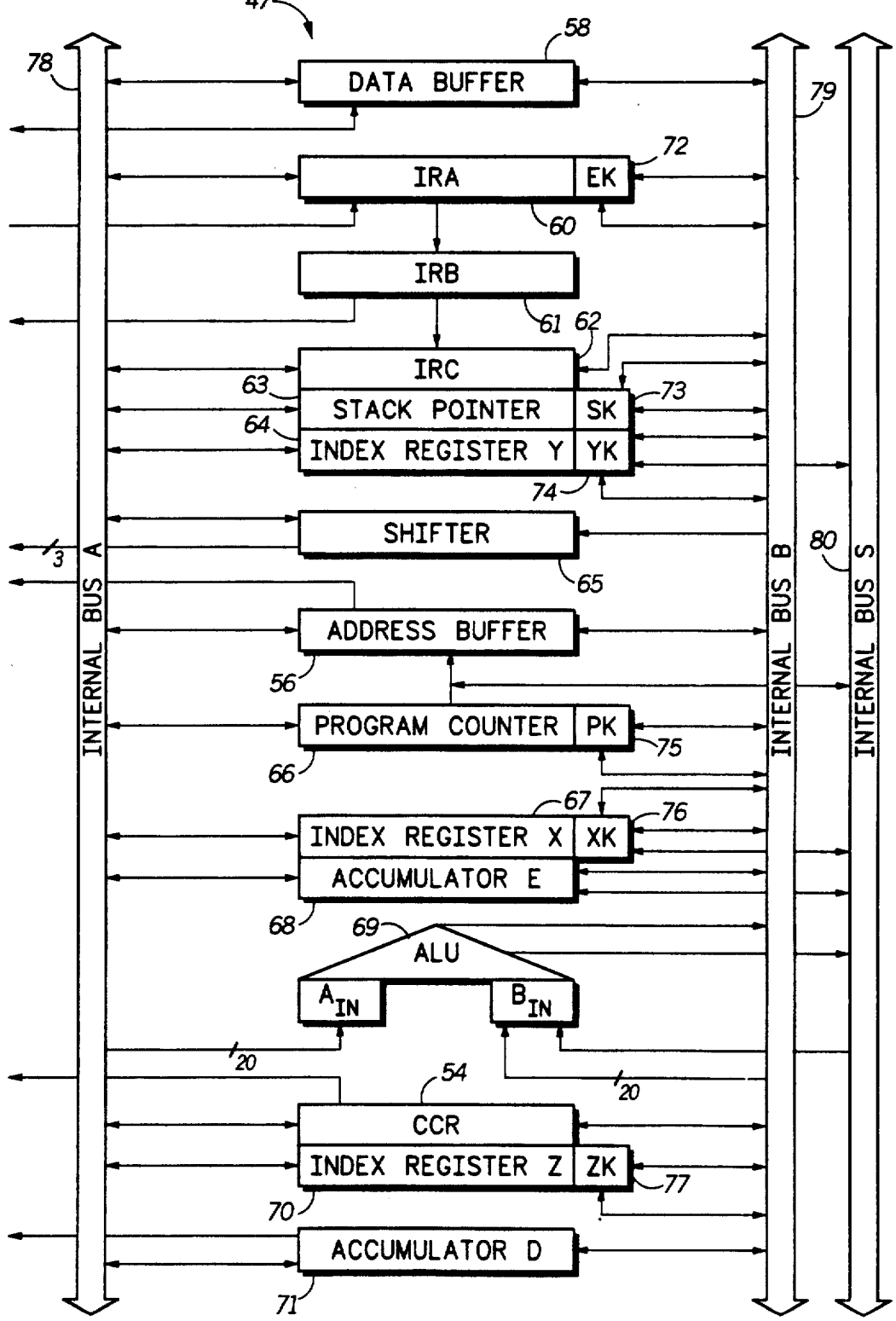

MICROCOMPUTER HAVING A MEMORY BANK SWITCHING APPARATUS FOR ACCESSING A SELECTED MEMORY BANK IN AN EXTERNAL MEMORY

FIELD OF THE INVENTION

This invention relates to data processors, and more particularly to data processors using memory bank switching techniques.

BACKGROUND OF THE INVENTION

As the demand for higher performance microcontrollers (MCUs) increases, semiconductor manufacturers are evaluating ways to design high performance MCUs, without sacrificing compatibility with low-end MCUs. Typically, the engineering investment in software development for microcontroller applications is significant. Thus, the design objective is to provide a family of MCUs wherein a higher performing MCU (i.e. 16-bit) is capable of running software generated for a lower performing MCU (i.e. 8-bit). Generally, meeting the stated objective imposes architectural constraints on the design of the higher performing MCU. In a typical 8-bit MCU design, the central processing unit (CPU) accesses only 64K bytes of memory. Generally, a significant performance enhancement is realized simply by expanding the addressable memory space, for example to 1M byte of memory, and thereby producing a 16-bit MCU capable of accommodating a larger memory space. In keeping with the stated objective, the design of a memory expansion scheme must allow the 16-bit MCU to execute source code generated for an 8-bit (existing) member of the MCU family.

Known 16-bit MCUs employ primarily two (2) memory expansion schemes, segmentation and simple bank switching. FIGS. 1A-B illustrate a known segmentation scheme 10 for memory expansion. In the segmentation scheme 10, a 16-bit logical segment base address is transferred into a 16-bit segment base register 12, via a logical address bus 18. The segment base address is shifted left four (4) bits to generate an extended 20-bit logical segment base address. A 16-bit logical offset address, stored in an offset register 14, is zero extended to produce a 20-bit logical offset address. After extension, the 20-bit logical segment base address is added to the 20-bit logical offset address by an adder 16, thereby generating a 20-bit (extended) physical address. The 20-bit physical address is transferred out to external memory (not shown), via physical address bus 17. Using the segmentation scheme 10, generates sixteen (16) 64K byte segments which can be placed on sixteen (16) byte boundaries. Most segmentation schemes require user intervention to update the segment base registers 12, and the offset registers 14, which may result in a performance penalty.

FIGS. 2A-B illustrate a simple bank switching scheme 20 for memory expansion. Generally, in the simple bank switching scheme 20, each memory bank is assigned a unique bank number. For example, the main memory may be sub-divided into sixteen (16) memory banks, whereby a 4-bit bank number is used to select a particular one of the sixteen memory banks. Accordingly, a 16-bit logical base address is transferred into an address register 22, via a logical address bus 25. A 16-bit offset address, stored in an offset register 23, is added to the 16-bit logical base address by an adder 26, and the result (16-bit logical address) is provided as an input to a concatenate logic block 27. The concatenate logic 27 receives a 4-bit logical memory bank address from a bank number register 24, and the 16-bit logical address from adder 26, and concatenates the two addresses, thereby providing a 20-bit (extended) physical address to physical address bus 28. The simple bank switching scheme 20 creates sixteen (16) 64K byte segments which can be placed on 64K byte boundaries. Generally, updating the value (memory bank address) stored in the bank number register 24 requires user intervention. Essentially, when the address calculation exceeds the boundary of the memory bank specified by bank number register 24, the simple bank switching scheme 20 will not allow the program to cross the memory bank boundary. Instead, the program will wrap-around within the specified memory bank. In order to cross a memory bank boundary, the user must first determine whether the address calculation crossed a memory bank boundary by performing a memory bank check, and then write a new memory bank number to the bank number register 24. Consequently, in the simple bank switching scheme 20, a performance penalty may occur when address calculations cross over bank boundaries. Thus, it is desirable to provide a memory expansion scheme capable of overcoming the foregoing problems.

SUMMARY OF THE INVENTION

A core central processor is provided for executing a plurality of instructions, and for communicating with an external memory, via a communications bus. The external memory is subdivided into a predetermined number of memory banks, and each one of the memory banks is defined by a boundary of memory addresses. The core central processor uses a memory bank switching unit for accessing a selected memory bank in the external memory. Logical memory addresses are stored in a first set of address registers. Each logical memory address is comprised of a first set of address bits, corresponding to a selected memory bank, and a second set of address bits, corresponding to a memory location in the selected memory bank. An adder adds the logical memory addresses stored in the first set of address registers to a logical offset address, and transfers the result, an extended physical address, to the communications bus. The adder selectively updates the first set of address bits of the memory address, via an internal communications bus, when the extended physical address exceeds the boundary of address for the selected memory bank, thereby allowing the processor to automatically access addresses which cross memory bank boundaries.

BRIEF DESCRIPTION OF THE DRAWINGS

FIG. 4 illustrates the internal register architecture of an execution unit of the core CPU of FIG. 3;

DETAILED DESCRIPTION OF THE INVENTION

Figure 1A:
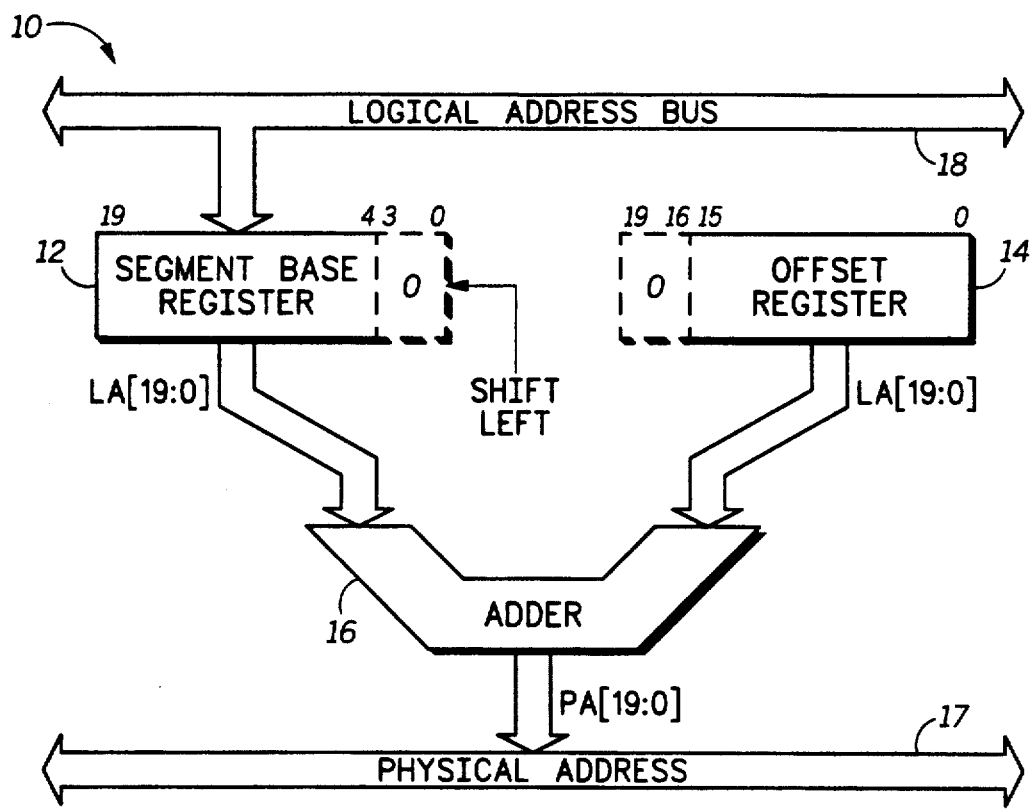
FIG. 1 illustrates a diagram of a prior art segmentation scheme for memory expansion.
Figure 1B:
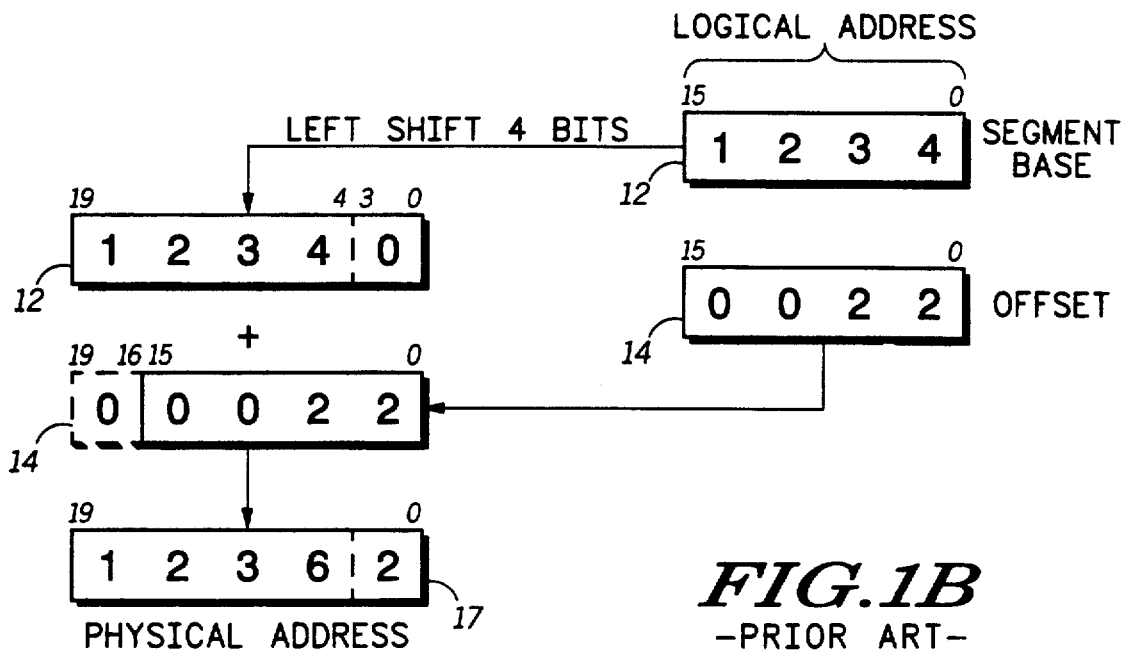
Figure 2A:
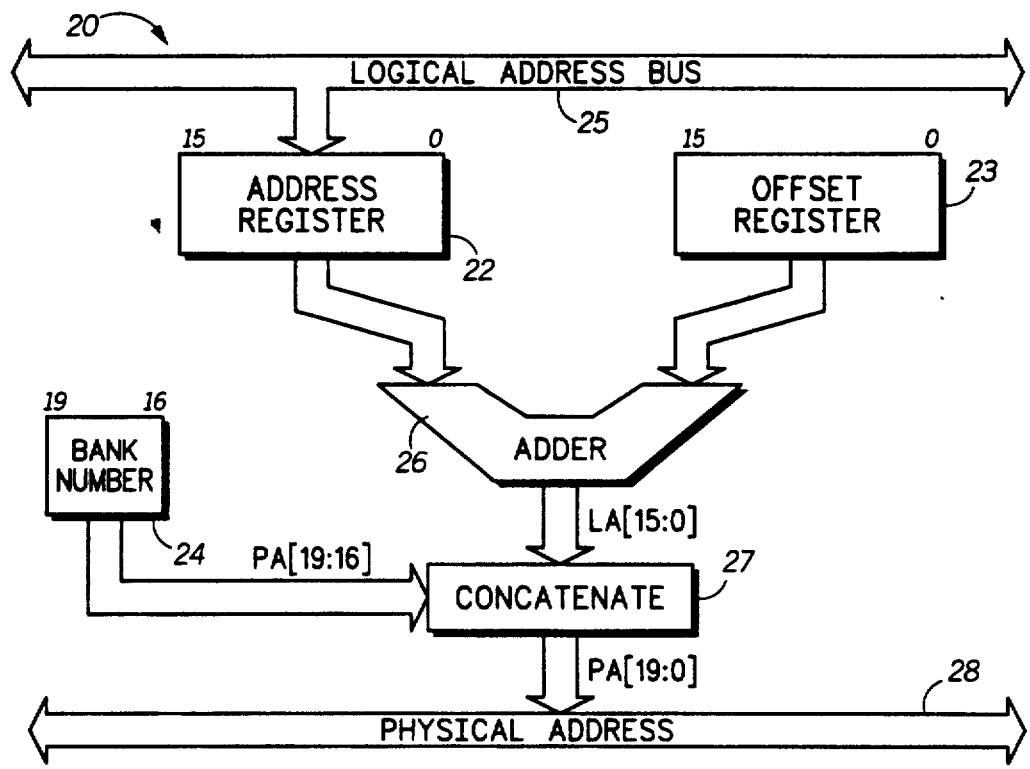
FIG. 2A and 2B illustrates a diagram of a prior art simple bank switching scheme for memory expansion.
Figure 2B:
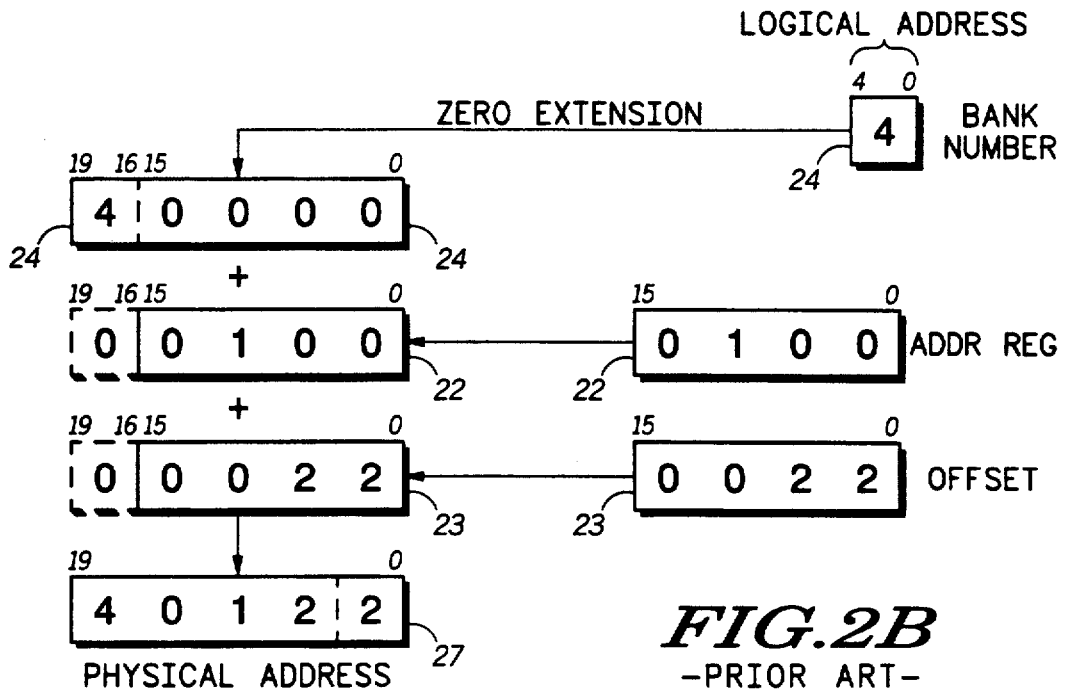
Figure 3:
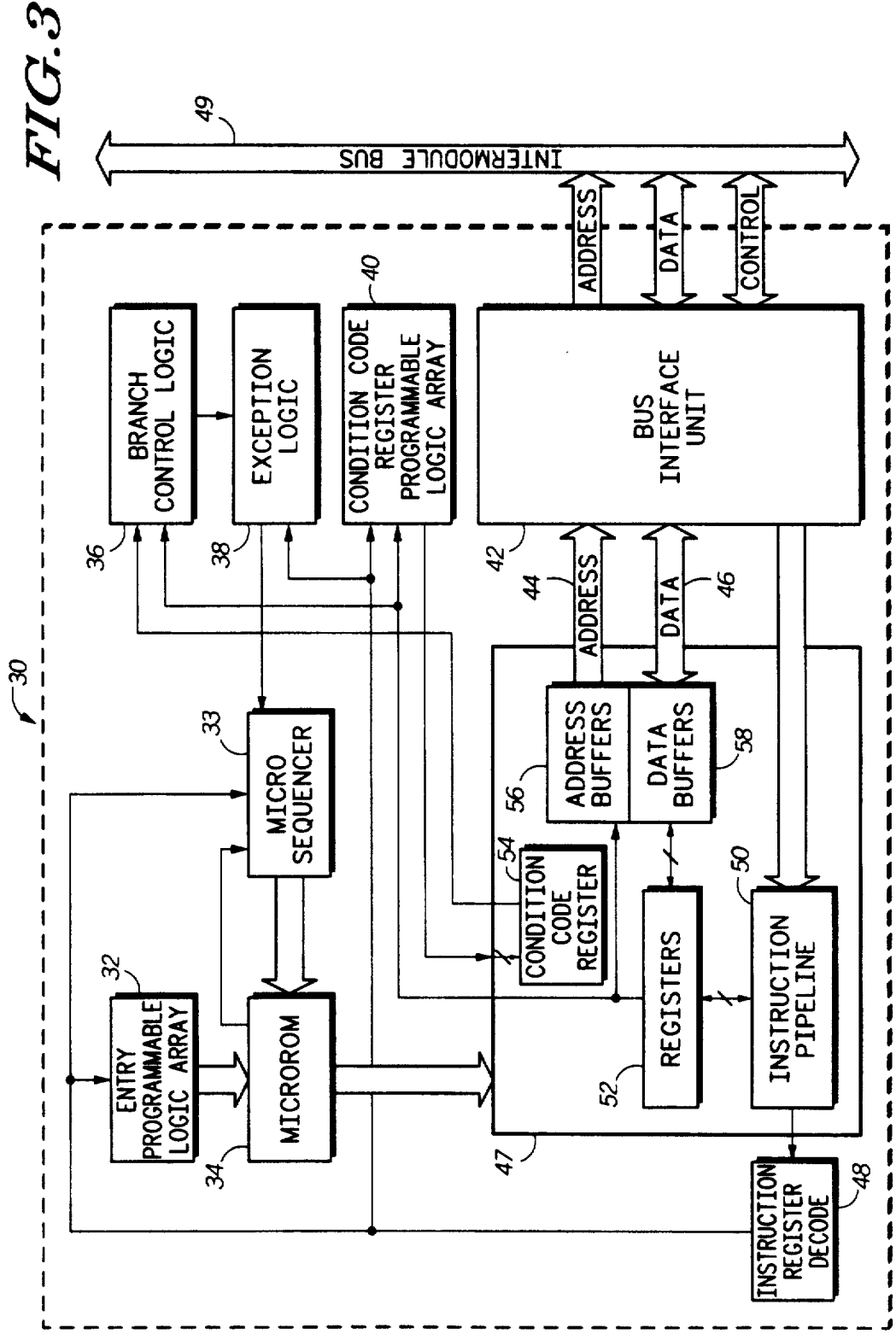
FIG. 3 illustrates, in block diagram form, a core central processing unit (CPU) having a memory expansion scheme, in accordance with the present invention.

Shown in FIG. 3 is a block diagram illustrating a core central processing unit (CPU) 30 having a memory expansion scheme in accordance with the present invention. CPU 30 comprises an entry programmable logic array (PLA) 32, a microsequencer 33, a microROM 34, branch control logic 36, exception logic 38, a condition code register (CCR) PLA 40, a bus interface unit (BIU) 42, an address bus 44, a data bus 46, an execution unit 47, and instruction register decode logic (IRD) 48. In the preferred embodiment, the execution unit (EU) 47 comprises an instruction pipeline 50, general purpose registers 52, a condition code register 54, address buffers 56, and data buffers 58. CPU 30 is an advanced 16-bit core CPU, designed for use with other sophisticated onchip peripherals. CPU 30 is a 16-bit core CPU module designed to communicate with other modules, and a memory (not shown) external to the core CPU 30, via an intermodule communications bus (IMB) 49. CPU 30 is a 16-bit superset of the Motorola MC68HC11 CPU, and provides current users of the MC68HC11 a roadmap to a higher performance system. Accordingly, CPU 30 is architecturally compatible with the MC68HC11, and supports all of the various addressing modes of the MC68HC11 while accommodating a larger program and data space.

In the preferred embodiment, CPU 30 is a pipelined data processor having an instruction pipeline (PIPE) 50 made up of instruction registers IRA, IRB, and IRC, 60, 61, and 62, respectively (FIG. 4). The PIPE 50 is structured such that instruction words are received, via the BIU 42, at one end of the PIPE 50, (e.g. IRA 60), and the values are shifted toward the other end (e.g. IRC 62) where they are used and then discarded. In the preferred embodiment, IRA 60 serves a dual function as an extended address register (FIG. 5B), whereby the instruction word, and an offset address which is part of the instruction may be loaded into the IRA 60. IRD 48 accesses the instructions in the PIPE 50, and provides a selected instruction (opcode) to the entry PLA 32 (for decoding), and the microsequencer 33. The entry PLA 32 decodes the instruction, and transfers the initial microaddress (of the microroutine to perform the particular instruction) to the microROM 34. The microROM 34 receives the initial microaddress from the PLA 32, reads out the corresponding microinstruction to the EU 47, and transfers the initial microaddress to the microsequencer 33. In the preferred embodiment, the microsequencer 33 is a state machine which controls the sequence of execution of the microinstructions stored in the microROM 34, by providing the next microaddress in the microroutine directly to the microROM 34. During normal operation, the microROM 34 transfers a predetermined number of microinstructions to EU 47, and the EU 47 performs the requested operations specified by the microinstructions. The IRD 48 provides status and control input signals to the CCR PLA 40, and to the exception logic circuitry 38, to indicate the occurrence of various processing conditions.

Shown in FIG. 4 is a block diagram illustrating the register architecture of the EU 47. In the preferred embodiment, three internal communications buses BUS A 79, BUS B 80, and BUS S 81 provide an interconnect between the various internal registers 52. CPU 30 has two (2) general purpose 16-bit accumulators, D 72, and E 68, and three (3) 16-bit index registers X, Y, and Z, 67, 64, and 71, respectively. Accumulator E 68, and registers X, Y, and Z, 67, 64, and 71, respectively, support word (16-bit) operands. In the preferred embodiment, accumulator D 71 is a 16-bit register, created by the concatenation of two (2) 8-bit accumulators A, and B (not shown). Accumulator D 71 operates on word (16-bit) sized data, while accumulators A, and B operate only on byte (8-bit) sized data. The registers and internal buses are 16-bits wide, however, all user visible resources (i.e. index registers 64, 67, and 71; the stack pointer (SP) 63; the program counter (PC) 66; and the various addressing modes) used to generate addresses are effectively 20-bits wide. Accordingly, the 16-bits generated by registers X, Y, and Z, 64, 67, and 71, respectively, correspond to $A_0$–$A_{15}$ on the address bus 44, whereas, address signals $A_{16}$–$A_{19}$ are derived from one of six (6) 4-bit K-Fields (discussed below).

Figure 5A:
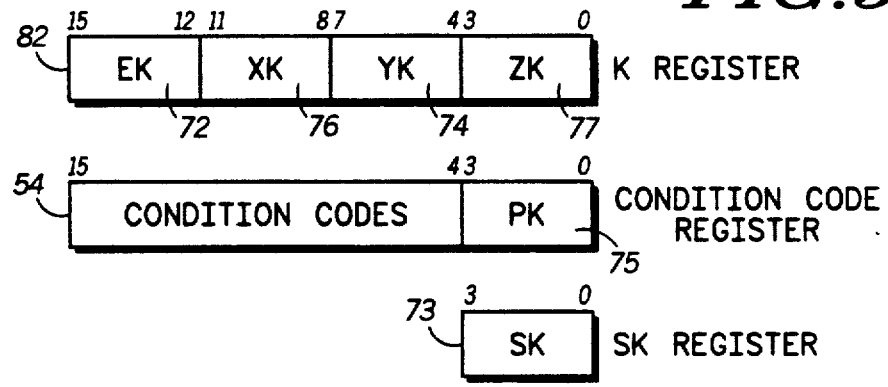
FIGS. 5A-B illustrate, in block diagram form, the programmer's model for the core CPU of FIG. 3.
Figure 5B:
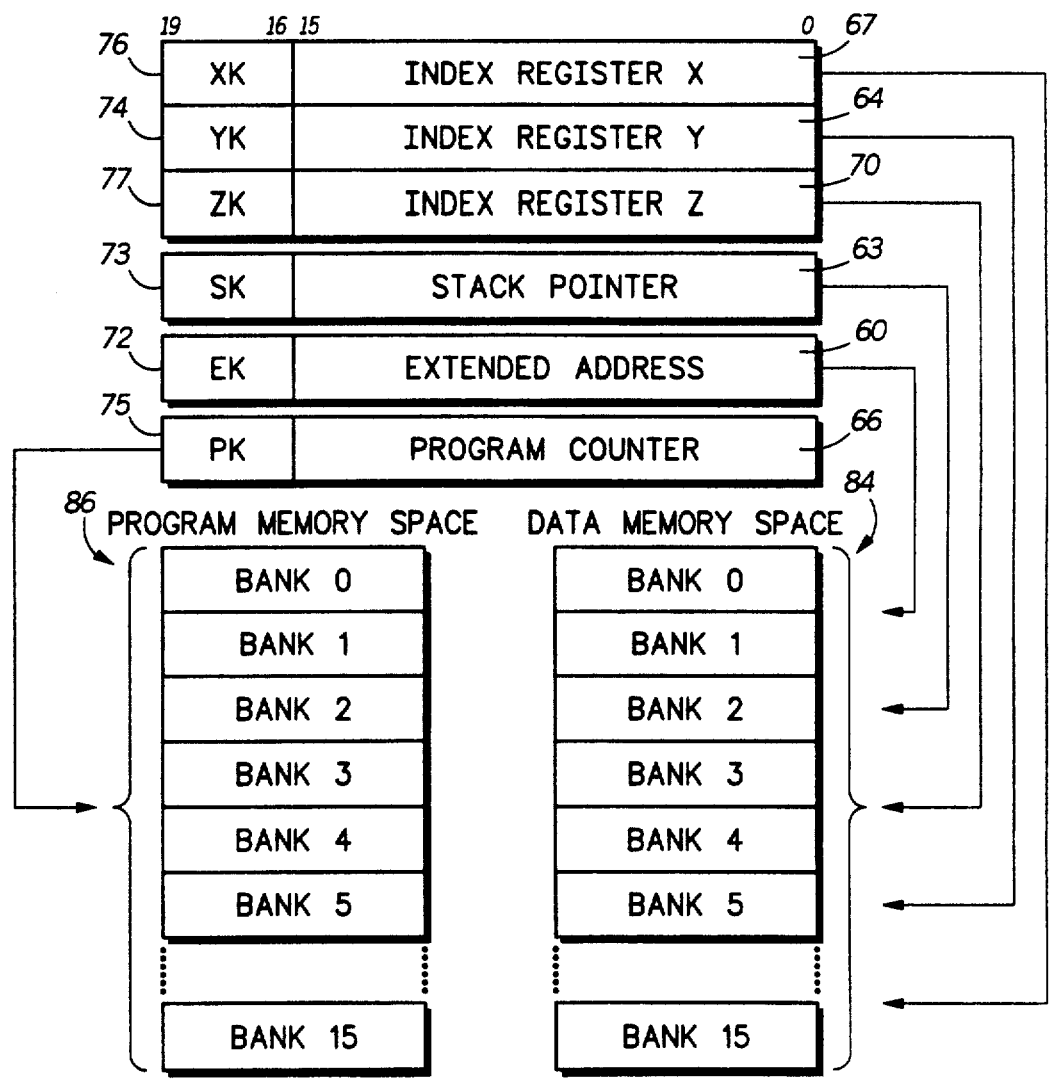

FIG. 5A-B illustrate, in block diagram form, the programmer's model for CPU 30. In a preferred embodiment of the present invention, CPU 30 has a 16-bit memory address bank register (K-Register) 82 which consist of four (4) 4-bit subfields (K-Fields), denoted as EK 72, XK 76, YK 74 and ZK 77. As shown in FIG. 5B, each 4-bit K-Field is the upper four (4) bits (bank number) of the 20-bit address generated by the CPU 30. Accordingly, the XK field 76 provides the upper 4 bits of the 20-bit address for all operand accesses using any of the indexed addressing modes on index register X 67. Similarly, the YK field 74 provides the upper 4-bits of the 20-bit address for all operand accesses using any of the indexed addressing modes on the index register Y 64. Likewise, the ZK field 77 provides the upper 4-bits of the 20-bit address for all operands accesses using any of the indexed addressing modes on index register Z 71, and for direct addressing. Furthermore, The EK field 72 provides the upper 4-bits of the 20-bit address for all operand accesses using the extended addressing mode. The PK field 75 provides the upper 4-bits of the 20-bit address for all program and RESET vector fetches, and the SK field 73 provides the upper 4-bits of the 20-bit address for all stacking and unstacking operations. The PK field 75 is loaded in bits 0-3 of the CCR 54, and as such, is stacked whenever the CCR 54 is stacked, and reloaded when the CCR 54 is pulled from the stack using a return from interrupt (RTI) or return from subroutine (RTS) instruction. In contrast, the SK field 83 is a stand alone 4-bit register.

In the preferred embodiment, each memory bank is comprised of 64K bytes of contiguous memory with the lower 16-bit address starting at hexidecimal address $0000 and increasing to $FFFF. As shown in FIG. 5B, the memory map is subdivided into data memory space 84, and program memory space 86, each of which comprises 16 memory banks, herein denoted as Bank 0 to Bank 15. All instruction fetches and the RESET vector fetches are from the program memory space 86. While all data and stack accesses, and exception vector fetches (except for RESET) are from the data memory space 84. CPU 30 differentiates between data memory space 84, and program memory space 86 by using a function code (FC) control signal, which is transmitted to the external memory (not shown), via the IMB 49. In the present invention, the address space bank switching scheme extends the available address map for CPU 30 to two (2) Mbytes, one (1) Mbyte of data memory space 84, and one (1) Mbyte of program memory space 86. The bank switching scheme is designed to make the CPU 30 address space appear pseudo linear.

In the present invention, each of the 4-bit K-Fields XK, YK, ZK, EK and SK may be explicitly modified using a set of transfer instructions, and implicitly modified as the result of adding to or subtracting from the index registers X, Y, and Z, 67, 64, and 70, respectively. Explicit modifications are made to the various K-Fields using a set of instructions which transfer the lower four bits of accumulator B (not shown) into the appropriate K-Field, via internal BUS B 79. The use of the transfer instructions provides independent access to the K-Fields. Implicit modifications to the K-fields occur when an addition to or a subtraction from a value in registers X 67, Y 64, Z 70, SP 63, or PC 66 causes the resulting value to overflow address $FFFF or underflow address $0000, thereby modifying the associated K-Field. If an overflow condition occurs, the corresponding K-Field is incremented by one, whereas, if an underflow condition occurs, the corresponding K-Field is decremented by one.

In the present invention, operand effective address calculation may cross bank boundaries. In the offset addressing modes, an operand fetch using an index register may generate a 16-bit address which is larger than $FFFF, or smaller than $0000. For example, an operand fetch uses index register X 67, and prior to the effective address calculation the contents of the XK field 76 represented Bank Number 14. After the effective address calculation, the 16-bit address generated is larger than $FFFF. Consequently, the output bits $A_{16}$-$A_{19}$ are automatically updated to reflect the address for the new bank number (Bank Number 15). Thus, operands can be accessed which exist in memory banks adjacent to the bank initially pointed to by the XK field 76. This applies to the index registers Y 64 and Z 70, and their corresponding K-fields, YK 74 and ZK 77, respectively. Accordingly, for operand read or write accesses which use an index register and the offset addressing mode, the 16-bit address is extended to a 20-bit address, by the XK field 76. Only the upper four address bits ($A_{16}$-$A_{19}$) which are placed on the address bus 44 are updated, the contents of the XK field 76 are not updated. Thus, the K-Field is not updated when an operand read/write access using an index register with offset addressing mode, causes an overflow or underflow condition. Conversely, the K-Field is automatically updated when an addition to or subtraction from an index register causes an overflow or underflow condition to occur.

CPU 30 allows both implicit and explicit jumping from an address in one memory bank, to an address in a different memory bank. Upon the occurrence of an underflow or overflow condition, the contents of both the PK field 75, and the upper four address bits ($A_{16}$-$A_{19}$) are updated. The implicit jump instruction loads the PC 66 with the effective address contained in the instruction format, and loads the PK field 75 from the corresponding K-Field (i.e. XK 76, YK 74, ZK 77 or EK 72). In the present invention, if the addressing mode used for the jump instruction is an offset of index registers X, Y or Z, 67, 64, or 71, respectively, and the indexing operation causes the 16-bit calculated effective address to overflow or underflow, then a value of one is added to, or subtracted from, the bank number (specified in the corresponding K-Field), prior to loading the PK field 75 in the CCR 54. Conversely, if the addressing mode used for the jump instruction is extended, the PC 66 is loaded directly from the 16-bit address contained in the jump instruction, and the PK field 75 is loaded directly from the EK field 72. The explicit jump instruction contains both the 4-bit immediate bank number (e.g. Bank 5) which is to be loaded into the PK field 75, and a 16-bit effective address which is loaded into the PC 66 as part of the instruction format. After execution of the explicit jump instruction, subsequent instruction fetches begin in the memory bank number (e.g. Bank 5) and at the address specified by the particular instruction. The only allowable address mode which can be used with the explicit jump instruction is a 20-bit extended address. Thus, the upper 4-bits correspond to the bank number, and the lower 16-bits correspond to the address within the memory bank.

In accordance with the present invention, the execution of a selected set of branch instructions (i.e. conditional branch), which causes the PC 66 to advance past a memory bank boundary (either forward or backward) automatically causes the PK field 75 to be updated accordingly. In the case of a branch to subroutine instruction, the address and bank number of the calling routine are pushed onto the stack (not shown) of CPU 30. Using a return from subroutine instruction, the bank number and address of the calling routine and pulled from the stack and loaded into the CCR 54 and PC 66, respectively, and instruction fetches begin at that address in the bank number.

In the present invention, the PK field 75 also changes as the result of a normal PC 66 increment. For example, assuming the contents of the PC 66 were $FFFE, and the contents of the PK field 75 were $3. Following the execution of a two (2) word (four byte) instruction, which did not cause a change of flow (i.e. jump, branch), the contents of PC 66 would be $0002, and the contents of the PK field 75 would be $4. Essentially, the overflow condition caused by incrementing the PC 66 requires incrementing the PK field 75 (bank number) by one. Accordingly, the automatic updating of the PK field 75, in conjunction with the various jump instructions discussed above, allows a program to automatically cross memory bank boundaries. Likewise, whenever the SP 63 is modified, either implicitly by an exception, or explicitly by a push or pull instruction, the SK field 73 is automatically updated. Accordingly, if the SP 63 modification causes a stack memory bank overflow or underflow condition to occur, the program will automatically cross memory bank boundaries (forward or backward).

Figure 6:
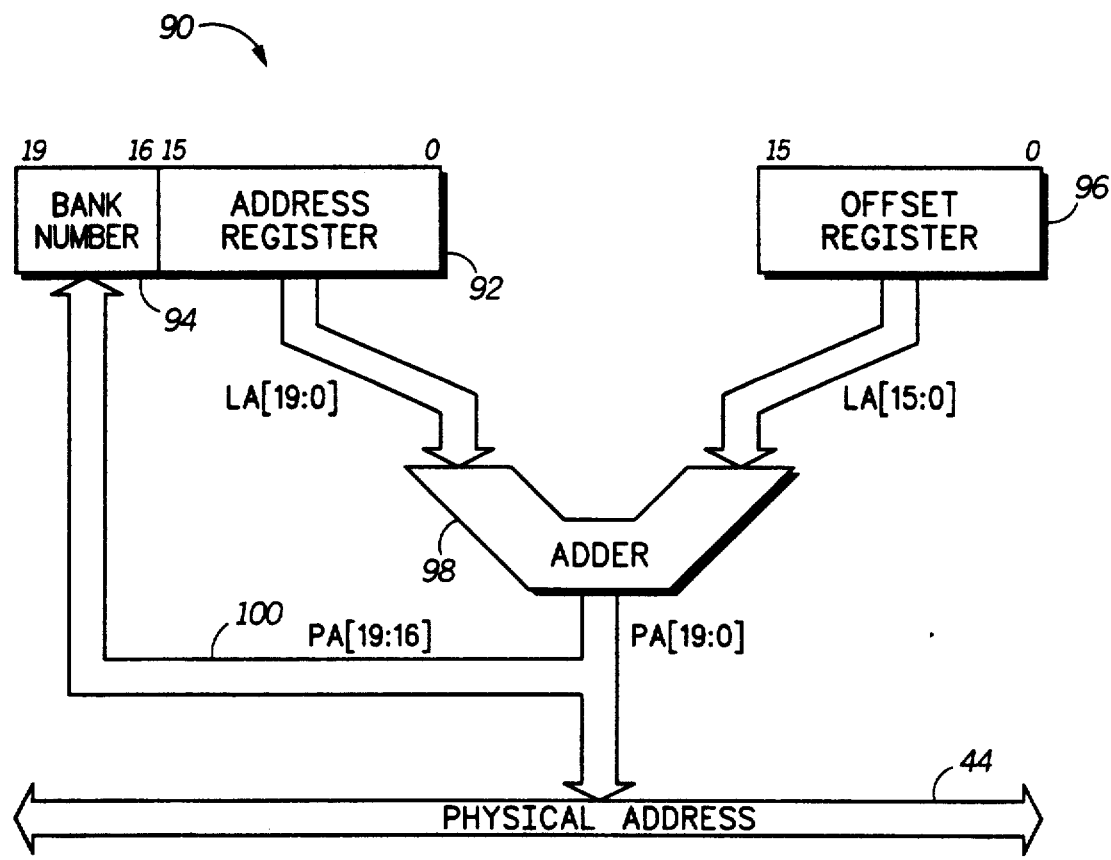
FIG. 6 illustrates a diagram of a memory expansion scheme, in accordance with the present invention.

Shown in FIG. 6 is a block diagram illustrating a memory expansion scheme 90 which allows the crossing of memory bank boundaries, in accordance with the present invention. In FIG. 6, address register 92 represents any one of the six registers shown in FIG. 5B (i.e. index register 64, 67, 70, SP 63, PC 66, or extended address register 60). The bank number register 94 represents the corresponding six (6) K-fields shown in FIG. 5B. The offset register 96 can be any general purpose register, such as Accumulator D 71 or E 68. In the indexed addressing mode, the contents of one of the 16-bit index registers (i.e. index register X 67) are added to a 16-bit offset address, which is included as part of the instruction, to form the effective address of the operand to be used in the instruction. Accordingly, a 16-bit offset address is loaded from the IRA 60 (FIG. 4) into the offset register 96, via the internal BUS A 78 (FIG. 4). An adder 98 in ALU 69 adds the 20-bit (extended) logical address stored in register 92 and 94, to the 16-bit logical offset address stored in offset register 96. Adder 98 provides a result which is a 20-bit (extended) physical address. The 20-bit physical address is transferred to the address buffer 56, via internal BUS S 81, and onto address bus 44.

As previously described, when the effective address calculation causes an underflow or overflow condition to occur, the upper four address bits $A_{16}$-$A_{19}$ are updated, by the adder 98, when transferred onto the S BUS 80. Essentially, the adder 98 increments or decrements the upper four address bits, prior to transferring the extended 20-bit physical address onto address bus 44. In selected cases, adder 98 automatically updates the bank number register 94 (K-field) by incrementing or decrementing the K-field by one. Accordingly, the adder 98 transfers the updated upper four address bits ($A_{16}$-$A_{19}$) to the corresponding K-Field (i.e. XK 76, YK 74), via the internal BUS B 79, herein represented by bus 100.

It should be apparent that the present invention provides a memory expansion scheme which permits a program to automatically cross memory bank boundaries, without user intervention. In the present invention, the memory bank address register 82 (FIG. 5A) stores a value corresponding to a selected memory bank (i.e. Bank 0), in a 4-bit subfield (K-Field). In the preferred embodiment, the K-field is implemented using six (6) bank number registers 94 (FIG. 6), each of which is coupled to the corresponding address register 92, to form a 20-bit (extended) logical address. During an effective address calculation, in the index addressing mode, a 16-bit logical offset address, stored in an offset register 96, is added to the 20-bit (extended) logical address, by an adder 98 in the ALU 69. The adder 69 transfers a 20-bit physical address onto an address bus 44, via the address buffers 56. When the calculated address crosses a memory bank boundary, the upper four (4) address bits ($A_{16}$-$A_{19}$) are automatically updated before transferring the 20-bit physical address onto the address bus 44. Thus, the program is allowed to cross a memory bank boundary without user intervention. Furthermore, in selected cases (i.e. addition to an index register), the contents of the bank number register 94 (address bits $A_{16}$-$A_{19}$) are automatically updated by the adder 98, via a feedback bus 100. Thus, the memory bank expansion scheme 90 of the present invention provides the capability to automatically cross memory bank boundaries, while automatically updating the information stored in the bank number register 94.

While the present invention has been described in a preferred embodiment, it will be apparent to those skilled in the art that the disclosed invention may be modified in numerous ways and may assume many embodiments other than that specifically set out and described above.

We claim:

1. In a data processing system having a processor for executing a plurality of instructions, and for communicating with an external memory that is subdivided into a predetermined number of memory banks, via a communications bus, wherein each one of said memory banks is defined by a boundary of memory addresses, memory bank switching means for accessing a selected memory bank in said external memory comprising:

register means for storing a plurality of memory addresses, wherein each one of said memory addresses comprises a first set of address bits corresponding to a unique memory bank, and a second set of address bits corresponding to a memory location in said unique memory bank;

first means, coupled to said register means, for adding a memory address stored in said register means to an offset address, said first means providing an extended memory address to said communications bus, and selectively updating said first set of address bits, of said memory address, via an internal communications bus, when said extended memory address exceeds the boundary of memory addresses for said unique memory bank, to allow said processor to cross the boundary of memory addresses for said unique memory bank to access information stored at said extended memory address.

2. The memory bank switching means of claim 1 wherein said offset address is provided with a selected instruction, in a first addressing mode, and provided by an offset register in a second addressing mode.

3. The memory bank switching means of claim 2 wherein said first means is an adder.

4. The memory bank switching means of claim 3 wherein said first means selectively updates said first set of address bits whenever said processor performs an addition or a subtraction operation on a value stored in said register means.

5. In a data processing system, a processor for executing a plurality of instructions, and for communicating with an external memory that is subdivided into a predetermined number of memory banks, via an external communications bus, wherein each one of said predetermined number of memory banks is defined by a boundary of memory addresses, said processor having memory bank switching means for accessing a selected memory bank in said external memory, said processor comprising:

a bus interface unit coupled to said external communications bus for transferring a predetermined number of memory addresses from said processor to said external memory, and for receiving a plurality of instructions for execution by said processor;

an execution unit coupled to said bus interface unit for executing said plurality of instructions received from said bus interface unit, said execution unit comprising:

first register means for storing a plurality of memory addresses, wherein each one of said memory addresses comprises a first set of address bits corresponding to a unique memory bank, and a second set of address bits corresponding to a memory location in said unique memory bank;

an internal communications bus coupled to said first register means; first means, coupled to said first register means via said internal communications bus, for adding a memory address stored in said register means to an offset address, said first means providing an extended memory address to said external communications bus, and selectively updating said first set of address bits of said memory address, via said internal communications bus, when said extended memory address exceeds the boundary of memory addresses for said unique memory bank, to allow said processor to cross the boundary of memory addresses for said unique memory bank to access information stored at said extended memory address.

6. The processor of claim 5 wherein said offset address is provided with a selected instruction, in a first addressing mode, and provided by an offset register in a second addressing mode.

7. The processor of claim 6 further comprising a microROM for storing a plurality of microinstructions for executing a selected instruction.

8. The processor of claim 7 further comprising a microsequencer for providing a sequence of next microaddresses to said microROM, thereby controlling the sequence of execution of the microinstructions.

9. In a data processing system having an external memory that is divided into a predetermined number of memory banks, wherein each one of said memory banks is defined by a boundary of memory addresses, a data processor coupled to said external memory for executing a plurality of instructions received from said external memory, via an external communications bus, said data processor having memory bank switching means for accessing a selected memory bank in said external memory, said data processor comprising:

first means coupled to said external communications bus for transferring a predetermined number of memory addresses from said data processor to said external memory, and for receiving a plurality of instructions for execution by said processor;

second means coupled to said first means for executing said plurality of instructions received from said first means, said second means comprising:

third means for storing a plurality of memory addresses, wherein each one of said memory addresses comprises a first set of address bits corresponding to a unique memory bank, and a second set of address bits corresponding to a memory location in said unique memory bank;

an internal communications bus coupled to said third means; fourth means, coupled to said third means via said internal communications bus, for adding a memory address stored in said third means to an offset address, said fourth means providing an extended memory address to said external communications bus, via said first means, and said fourth means selectively updating said first set of address bits of said memory address, via said internal communications bus, when said extended memory address exceeds the boundary of memory addresses for said unique memory bank, to allow said data processor to cross the boundary of memory addresses for said unique memory bank to access information stored at said extended memory address.

10. The processor of claim 9 wherein said first means is a bus interface unit.

11. The processor of claim 10 wherein said second means is an execution unit for executing said instructions received from said bus interface unit.

12. The processor of claim 11 wherein said offset address is provided with a selected instruction, in a first addressing mode, and provided by an offset register in a second addressing mode.

13. The processor of claim 12 further comprising a microROM for storing a plurality of microinstructions for executing a selected instruction.

14. The processor of claim 13 further comprising a microsequencer for providing a sequence of next microaddresses to said microROM, thereby controlling the sequence of execution of the microinstructions.

* * * * *